United States Patent [19]

Hohman, Jr. et al.

[11] Patent Number: 5,205,895

[45] Date of Patent: Apr. 27, 1993

[54] METHOD OF FORMING BONDED JOINTS

[75] Inventors: Alvin E. Hohman, Jr., Dallas; Howard M. Price, Burleson, both of Tex.

[73] Assignee: Loral Vought Systems Corporation, Grand Prairie, Tex.

[21] Appl. No.: 347,625

[22] Filed: May 5, 1989

[51] Int. Cl.$^5$ .................. B32B 31/00; C09J 5/04
[52] U.S. Cl. .................. 156/293; 156/307.5; 156/310; 156/315; 428/420
[58] Field of Search ............ 428/420; 156/315, 310, 156/307.5, 293

[56] References Cited

U.S. PATENT DOCUMENTS

| | | | |
|---|---|---|---|
| 2,970,077 | 1/1961 | Groves | 156/315 |
| 3,406,087 | 10/1968 | Potter | 156/330 |
| 3,663,354 | 5/1972 | Ueno et al. | |
| 3,767,223 | 7/1972 | Vazirani | |
| 3,936,342 | 2/1976 | Matsubara et al. | |
| 4,022,649 | 5/1977 | Nakagome et al. | |
| 4,035,436 | 7/1977 | Matsubara et al. | |
| 4,169,006 | 9/1979 | Matsubara et al. | |
| 4,337,111 | 6/1982 | Kauffman et al. | 428/420 |

OTHER PUBLICATIONS

Thompson, R., "Assembly of Fabricated Parts, Adhesive Bonding", *Modern Plastics Encyclopedia*, Oct., 1986, vol. 63, No. 10A, pp. 350–354, McGraw-Hill Publications Company, New York, N.Y.

*Primary Examiner*—John J. Gallagher
*Attorney, Agent, or Firm*—Richards, Medlock & Andrews

[57] ABSTRACT

A process for establishing bonded joints in the formation of multi-component adhered structures in which chemical bonding is established between adhesive and primer layers to provide for increased interlaminar strength. Curable resin primer layers are established on surfaces which are to be joined together in forming the multi-component structure. The primer resin is heated at a temperature and for a time period sufficient to expel substantial volatile matter from the resin, but insufficient to cross-link the resin to a completely cured state, thus leaving active bonding sites in the resinous primer layers. Bonding of the two components is provided by means of an intermediate adhesive layer between the mating surfaces. The adhesive layer is formed of a curable resin having bonding sites available for reaction with bonding sites in the primer resin. After joining the mating surfaces, the structure is heated to a temperature substantially in excess of that employed in partially curing the primer resin layer for a period of time sufficient to cure the adhesive and primer resins in the joint and establish chemical bonding between the interface of the adhesive and primer resins.

20 Claims, 1 Drawing Sheet

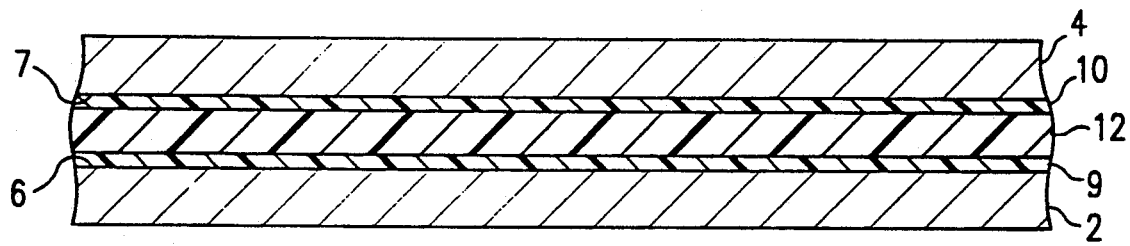
FIG. 1
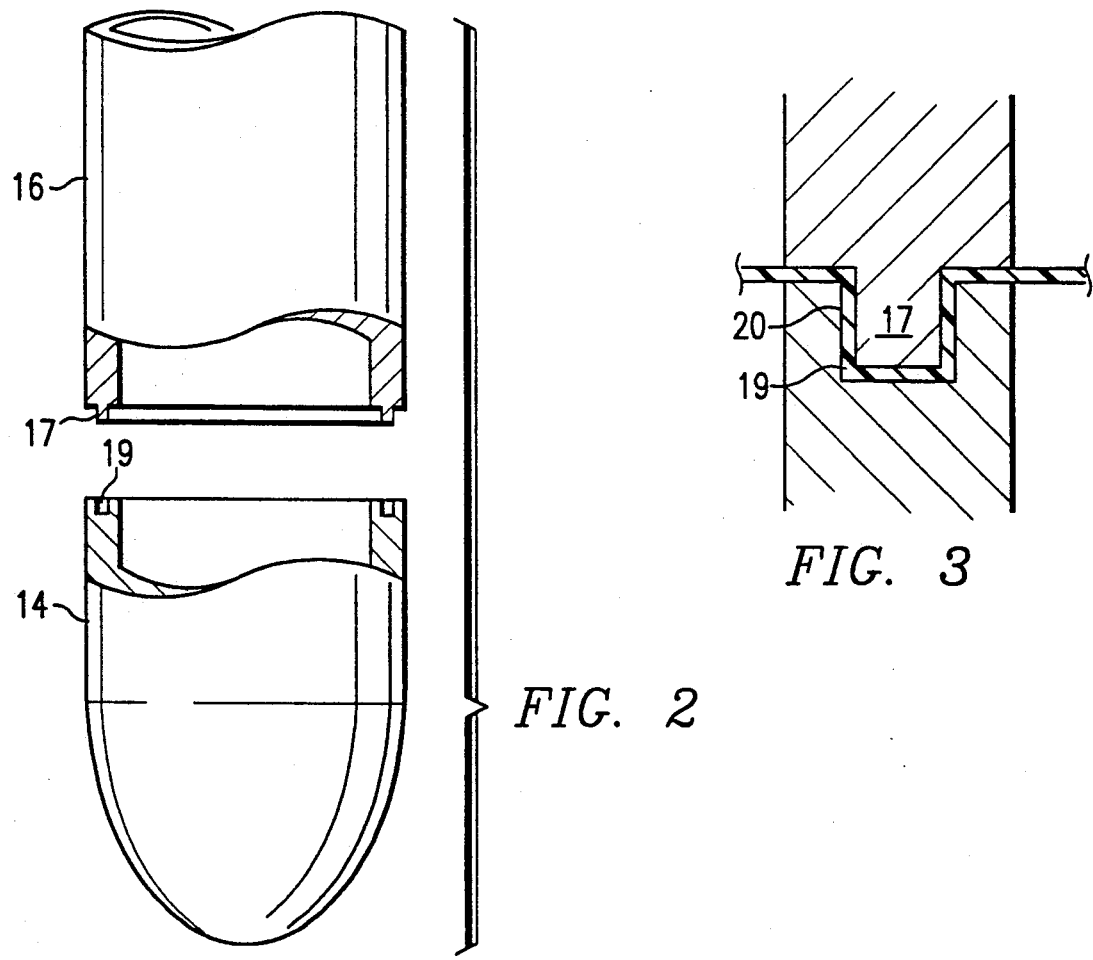
FIG. 2
FIG. 3

METHOD OF FORMING BONDED JOINTS

FIELD OF THE INVENTION

This invention relates to the adhesive bonding of multi-component structures and more particularly to a method for establishing bonded joints between adherend surfaces by the use of interlocking primer and adhesive layers.

BACKGROUND OF THE INVENTION

Resin adhesives are used to establish bonded joints between the mating surfaces of adhered structures. Typical of such structures are the metal or composite laminate structures used in various applications such as airframe or surface skin components of aircraft or space vehicles. Such structures may be formed through the use of adhesives to bond one laminate ply to another. Two metal surfaces such as aluminum or tungsten surfaces may be bonded together or a composite material, e.g. graphite, a carbon-carbon composite or reinforced plastic or refractory composites may be bonded to another composite or metal surface. For example, one form of composite panel can comprise alternate layers of a graphite composite and a titanium alloy.

In bonding laminate plies or other mating surfaces to one another, it is conventional practice to add thermosetting adhesive resins which are applied to one or both adhered substrates after which the substrate surfaces are brought together, usually under pressure and with heating to cure the adhesive so that it provides a rigid joint. Numerous thermosetting resins are useful in adhesive applications. The resin of choice in a particular application will depend upon many factors, such as the character of the substrate surfaces to be joined, the environment in which the structure is to be used, e.g. considering such factors as temperature, moisture conditions and the like, and the strength desired at the bonded joint.

Various thermosetting resins and their uses in bonding different materials are disclosed in Thompson, R., "Assembly of Fabricated Parts, Adhesive Bonding", *Modern Plastics Encyclopedia*, October, 1986, Vol. 63, No. 10A, pp 350-354, McGraw-Hill Publications Company, New York, N.Y. Of the adhesive resins typically used in aircraft or space structure applications; rigid epoxy and polyurethane type resins usually are preferred. Others which are also used in such applications include polyimide resins, polyamide resins, usually where atmospheric moisture levels are controlled in the use environment, and polysulfide resins, where an usually high degree of flexibility is required.

Oftentimes primer coatings are applied to the substrate surfaces, and in some cases, prior to applying the primer coating, a substrate surface is subjected to a surface treatment to increase the adherence between the primer coating and the substrate surface. Such primer coatings may take the form of resinous adhesive materials which may be the same or different than the adhesive layer itself. Most primers involve epoxy resins although other resins suitable for primer applications include polysulfides, silicons and bismaleimide polymers. The primer, in addition to providing a good bondable surface for the adhesive layer, also serves as a corrosion protective coating for the substrate material in the bond line area. The primer layer may be required to endure for days, weeks or even months. One widely used protocol for the fabrication of aluminum alloy faced sandwich structure is disclosed in Aerospace Materials Specification AMS-3911A, Society of Automotive Engineers, revised Apr. 1, 1983. As described there, after treating the surface by degreasing followed by acid etching, primer is applied by spraying the surface to provide a coating 0.0001-0.0007 inch. After spraying, the primer coating is initially dried for at least 30 minutes at about 75° F. and thereafter cured for 75-90 minutes at a temperature of 230°-250° F. U.S. Pat. No. 3,663,354 to Veno et al. discloses a primer suitable for use on metal adhered substrate surfaces where the adhesive resin is in the form of a linear polyimide cement. The primer is described as a curable precondensate of a resol-type phenolic phenol formaldehyde resin and an epoxy resin. The primer may be applied to the substrate surface in a molten state or sprayed in a solvent solution with the solvent then being evaporated. Before application of the linear polyimide adhesive, the primer coating is cured at 170°-230° C. for 3-30 minutes to provide a coating having a thickness of about 1-20 microns.

Another process involving the use of thermosetting resins to join metallic components together employing a primer coating and a polyimide adhesive is disclosed in U.S. Pat. No. 3,936,342 to Matsubara et al. Here, a primer comprising a mixture of a bisphenol A type epoxy resin and a phenolic resin is employed as a primer. In applying the primer to metallic surfaces, the resin formulation may be dissolved in ketone solvents such as acetone or methylethyl ketone, aromatic compounds such as toluene or xylene, glycols, esters or alcohols and applied to the substrate surface. The solvent is removed from the coated resin layer by drying and the resin is cured to provide a film having a thickness of about 1-10 microns, particularly 2-6 microns. Drying may be accomplished in an air stream at 60° C., and the primer coating then cured at a temperature of 180°-300° C. for 30 seconds to 15 minutes. The polyimide resin is applied at a temperature of 200°-300° C. to provide an adhesive layer of thickness of about 10-200 microns. The structure is then cooled with the polyamide resin providing an adhesive between the primer resin layers.

Another procedure employing resin priming of metallic surfaces is disclosed in U.S. Pat. No. 4,035,436 to Matsubara et al. Here, the primer coating is provided by an epoxy-phenol resin, a phenol resin, an epoxy urea resin, an epoxy ester resin or an epoxy amino resin. Similarly, as in the case of the aforementioned Matsubara '342 patent, the resin coatings are cured by heating, e.g. at 160°-220° C. for 5-10 minutes, and a polyamide adhesive is used to bond the substrate surfaces together. Disclosed in this reference are nylon-based polymers which may be modified by the addition of other polymers such as fatty acid polyamides and polyethylenes.

U S. Pat. No. 4,169,006 to Matsubara et al. discloses a primer coating provided by the reaction product of a polyester resin obtained as the reaction product of a polycarboxylic acid component and a polyhydric alcohol component and a bisphenol A type epoxy resin. As in the previous Matsubara patents, the resin coatings are baked at high temperatures, e.g. 160°-185° C. for 10 minutes, in order to effect a curing of the resin coating.

U.S Pat. No. 4,022,649 to Nakagome et al. discloses a process for producing metal laminate structures of high thermal resistance in which one resin coating is dried to provide a prelaminate coating flow residual volatile content and another coating is of a higher volatile matter content. A resin material characterized as a polymer containing heterocyclic rings is supplied to a substrate surface and dried to provide a film having a thickness of 20–300 microns with a residual volatile content ranging from zero up to 3% by weight. This film is heated at a temperature of about 250°–350° C. for up to 2 hours. In a specific example, the initially applied polymer was heated at 100° C., 180° C. and 260° C. for 30 minutes to provide a prelaminate layer having a residual volatile content of 0.8% and a thickness of 50 microns. A second solution of a polymer, also characterized as a polymer containing heterocyclic rings, is applied to the other substrate surface in a thinner film, for example, 2–20 microns and dried to provide a film having a higher volatile matter content of 4–20% by weight. The two mating surfaces are brought together at a high temperature, e.g. 270° C. for 30 minutes.

SUMMARY OF THE INVENTION

In accordance with the present invention, there is provided a process for establishing bonded joints in the formation of multi-component adhered structures in which chemical bonding is established between adhesive and primer layers to provide for increased interlaminar strength. In carrying out the invention, a curable resin primer layer is established on at least one of the conforming mating surfaces which are to be joined together in forming the multi-component structure. The primer resin layer is heated at a temperature and for a time period sufficient to expel substantial volatile matter from the resin; however, the conditions in this step are not sufficient to cross-link the resin to a completely cured state, thus leaving active bonding sites in the resinous primer layer. The resinous primer layer is applied by spraying or other suitable technique to provide a thin film on the substrate so that after the drying and partial curing step, the primer coating is preferably about 0.0001–0.0007 inch thick. More preferably, the thickness is within the range of 0.0001–0.0004 inch. The bonding together of the two components is provided by means of an intermediate adhesive layer between the mating surfaces. The adhesive layer is formed of a curable (thermosetting) resin having bonding sites available for reaction with bonding sites in the primer resin. After joining the mating surfaces, the structure is heated to a temperature substantially in excess of that employed in partially curing the primer resin layer. This temperature is maintained for a period of time sufficient to cure the adhesive and primer resins in the joint and establish chemical bonding between the interface of the adhesive and primer resins. Preferably, the temperature during the second heating step is at least 50° F. greater than the temperature during the initial heating step.

BRIEF DESCRIPTION OF THE DRAWINGS

FIG. 1 is a schematic cross-sectional view showing a joint formed in accordance with the present invention;

FIG. 2 is an illustration partly in section showing the use of the invention in bonding a tongue and groove type joint; and FIG. 3 is an enlarged view of the joint of FIG. 2.

DETAILED DESCRIPTION

In bonding metal or composite components to one another through the use of adhesives, it is a conventional practice to prepare the joint surfaces in a manner to enhance mechanical locking and chemical bonding to develop high bonding strengths. Usually, both the surfaces to be joined will be treated, although in some cases where a surface is highly irregular in nature, e.g. as in the case of a honeycomb or perforate structure, only one surface need be pretreated. After treating of the substrate surfaces, they are highly susceptible to degradation because of surface oxidation or airborn soil contaminants. In order to protect the treated surfaces from contamination, it is conventional practice to apply adhesive primers to the treated surfaces immediately after treatment. Such primers also provide a long term protection from degradation due to corrosion in the case of metallic components.

In the present invention, such primer layers are employed in a manner to not only protect the substrate surfaces from contamination, but also to enhance the strength of the bonded joint. In carrying out the invention, the primer layer is applied to the substrate surface, usually after a pretreating step, in a manner, such as by spraying in a suitable solvent, to provide relatively thin film on the substrate surface. The primer resin is partially cured under relatively moderate conditions sufficient to expel a substantial portion of the volatile material. The partially cured primer layer has bonding sites which are available for cross-linking with reaction sites in the adhesive resin. After the conforming mating surfaces are brought together with the intervening adhesive resin, the joint is heated at a temperature and for a period sufficient to cure the primer resin and adhesive layers. The mating surfaces are in contact for a time and at a temperature adequate to produce polymerization reactions between primer and adhesive layers. This results in cross-linking across the adhesive-primer interface and provides a joint of substantially greater strength than that provided by the conventional procedure in which the primer layer is cured prior to application of the adhesive layer. The relatively high strength joint can be achieved notwithstanding the presence of volatile matter retained in the primer layer which might be expected to disrupt the adhesive-primer interface.

As noted previously, in typical manufacturing procedures the primer layers may be in place for prolonged periods of time before the component parts are assembled. It is highly desirable that the primer resin layers be in a tack-free state where they can be covered with a protective material such as Kraft paper until they are to be used. It is preferred, in carrying out the invention, to partially cure the primer layers under time and temperature conditions to arrive at such a tack-free state for the exposed primer surfaces while the layer itself is only partially cured as described above to provide the active sites for ultimate bonding with the adhesive layer. Specifically, the partial curing step can be carried out to effect a tack-free state for the exposed surfaces as determined in accordance with ASTM Standard D 2377-73 "Test for Tack Free Time of Caulking Compounds and Sealants" wherein a polyethylene film imposed on a primer layer in accordance with ASTM D 2377-73 does not adhere to and cause material transfer to the film.

Turning now to the drawings, FIG. 1 illustrates a schematic cross-sectional view showing two adhered components bonded together in accordance with the present invention. The invention will be described here with reference to the use of an epoxy resin, in both the primer coatings and the adhesive layer, in joining two metallic components together. However, it is to be recognized that other thermosetting resins can be used, and that the adhesive and primer layers may be provided by the same or different resins, depending upon the nature of the substrates to be joined together.

As shown in FIG. 1, the structure comprises metallic panels 2 and 4. Panels 2 and 4 may be the laminate plies in a laminated panel structure or they may represent the overlapping portions of two components, as in the case of a lap joint between such components. Panels 2 and 4 are formed of metals such as aluminum, titanium or alloys of such metals. Disposed on the substrate surfaces 6 and 7 are primer layers 9 and 10, respectively. Interposed between the primer layers is an adhesive layer 12. The thicknesses of the respective layers are exaggerated for purposes of clarity. Typically, layers 9 and 10 will have a nominal thickness of about 0.0002–0.0003 inch. The adhesive layer will have a thickness of about 0.007 inch. In forming the joint shown in FIG. 1, the surfaces 6 and 7 are subjected to any suitable surface treatment procedure. For example, in the case of a titanium joint, they may be subjected to a phosphate fluoride surface treatment such as described in U.S. Pat. No. 3,676,223 to Vazirani which involves contacting the surfaces with a hydrofluoric-phosphoric acid solution. Prior to the surface treatment, the surfaces may be cleaned with a organic solvent to effect degreasing as described in the Vazirani patent. Immediately after the pretreatment step, the resinous primer coating is applied to surfaces 6 and 7. Typically, this is accomplished by spraying a solution of the resin in a suitable organic solvent to provide a thin film on the surfaces 6 and 7. The sprayed polymer solution will normally contain about 20–60% thermosettable resin with the remainder being solvent. It is highly desirable that the primer coating be relatively thin as applied. In practice, the initial coating thickness should not exceed about 0.001 inch.

After application of the primer coating, the surfaces 6 and 7 are heated under temperatures sufficient to expel a substantial amount of the volatiles due to the light solvent material, and depending upon the nature of the resin used, also light reaction products which occur during cross-linking of the resin. It is essential that moderate conditions be used during this step in order to effect substantial drying and partial, but not complete, cross-linking so that the resin layers only partially cure. Normally in this step, the coated substrates are heated at atmospheric pressure to a temperature within the range of 150°–200° F. for a period of about 0.5–2 hours, more preferably 0.5–1 hour. The optimum temperatures and time durations within these ranges will vary from one resin to another and will also depend upon the initial solvent vaporization temperature, the degree of cross-linking desired and the desired amount of volatiles to be expelled. Preferably, heating is carried out at a temperature and for a time sufficient to expel at least 90% of the matter which would be volatilized at the subsequent heat curing step described below. At the same time, it is believed desirable to provide that the degree of cross-linking not exceed 50%, that is, 50% or more of the original active sites for cross-linking will remain at the conclusion of the step of heating the primer layer. The conditions for achieving this parameter will, of course, vary from resin to resin but can be readily determined by those skilled in the art. In this respect, the time and temperature conditions to be applied during the partial cure of the primer resin are, of course, inversely related with higher temperatures calling for shorter time durations and visa versa. In particular, for a given resin, the time duration and temperature can be selected in accordance with the well known Arrhenius equation to arrive at the desired degree of partial cross-linking.

After heating the primer layers to effect the partial curing, the adhesive layer 12 is applied, and the two components parts 2 and 4 brought together, preferably under an applied pressure. The adhesive layer preferably is applied as a paste or calendered film of high molecular weight resin (or mixture of resins) so as not to increase volatilization unnecessarily during the final curing step. In the final curing step, the joint is heated to a substantially higher temperature than that employed during the initial partial curing of the primer coatings. Normally, the temperature here will be greater than the initial temperatures by an increment of at least 50° F. Heat and pressure are applied to the structure for a period sufficient to cure the adhesive and complete the cure of the primer coatings. At the conclusion of the curing step, the adhesive layer is substantially thicker than the primer layers but is still relatively thin; usually on the order of about 0.005–0.01 inches.

For example, in forming a laminate structure, the adherends may be pressed together by platens under an applied pressure of about 45 psi for a period of about 1 to 2 hours. The curing temperature normally should be in the range of about 250°–350° F.

It is especially important that the initial primer layer be relatively thin as described above, not only in terms of providing a good interface between the primer layer and the substrate surface but also in terms of minimizing the amount of volatile matter actually formed during the final curing step. As noted previously, some volatile matter is left in the primary coatings. Depending upon the nature of the joint involved, little or none of this volatile matter will escape during the final curing step.

The importance of providing a thin primer layer can be illustrated by reference to FIG. 2 which shows the use of the invention in bonding a tongue and groove type joint. In FIG. 2, component 14 is an ogive shaped structure which is to be joined to a cylindrical housing 16. The forward portion of the housing 16 is provided with a tongue 17 fitting into a circumferential groove 19 formed in the base of the ogive 14. In joining the components 14 and 16, the tongue 17 of the cylindrical housing 16 and the groove 19 of ogive 14 are sprayed with thin films of the primer resin. This is followed by heating to expel volatiles and partially cure the primer resin as described above. Thereafter, adhesive 20 is applied to one or both of the tongue and joint surfaces and the two materials brought together to the relationship shown in the enlarged sectional view of FIG. 3 and subjected to a curing stop, as described above. By providing an initial thin primer coating, the volatile material, which is for all practical purposes trapped in the joint, can be kept to a minimum. At the same time by stopping short of a complete cure of the primer coatings, an effective high-strength bond is provided across the adhesive primer interface.

In experimental work carried out respecting the invention, double lap shear strengths in which failure occurred predominantly in the body of the primer-adhesive structure, or at the primer-substrate interface, were determined for joints arrived at through application of the present invention. These lap shear strengths as indicated below in Examples I, II and III, are compared below with those found in joints formed in accordance with prior art techniques as reported in vendor information or as determined experimentally.

EXAMPLE I

In one set of experimental wok, three double lap joints were formed using phosphate/fluoride treated titanium. A chromated epoxy primer, available from American Cyanimid under the designation BR-127, was applied as primer coatings in 0.0002 inch film thickness. The primer coatings were partially cured for 2 hours at 160° F. The substrates were then adhered using a modified epoxy adhesive available from American Cyanimid under the designation FM-73. The adhered joints were then cured at 310° F. for 7 hours. An average of three specimens tested, showed a lap shear strength at −40° F. of 5193 psi.

Corresponding work reported by a third party using the same adhesive as described above but a different primer, identified as a proprietary epoxy primer, resulted in substantially weaker joints. Here, the primer was heated for 1 hour at 250° F. under, conditions which are thought to have resulted in a complete cure of the primer in accordance with the standard prior art procedure. The adhesive FM-73 was heated at 310° F. for 7 hours similarly as above. The resulting average of three specimens showed a lap shear strength at −40° F. of 2260 psi.

EXAMPLE II

In a second set of experiments, double lap shear strengths were determined for chromate treated aluminum substrates employing the primer BR-127 identified above and a paste adhesive available from Hysol Corporation under the designation EA 934. In the experimental simulative of the present invention, layers of the epoxy primer were applied to the chromate treated substrates and partially cured for 1 hour at 160° F. The paste adhesive was then applied using scrim cloth to obtain an adhesive thickness of about 0.01 inch. The adhesive was then cured for 1 hour at 250° F. Tests were carried out employing three specimens with the average of the three tests showing a lap shear strength at ambient laboratory temperature (room temperature) of 4800 psi. A second set of experiments were carried out under conditions similar to those used in the first set of experiments except that the BR-127 primer was cured for 1 hour at 250° F. Here, the lap shear strength, for an average of three specimens, was 3200 psi under room temperature conditions.

The results in the second set of experiments reported immediately above conformed very closely to vendor reported results using the paste adhesive EA 934, but with a modified epoxy primer available from Hysol Corporation under the designation EA 9228. Here, the primer was cured for 1 hour at 250° F. followed by the adhesive cured for 1 hour at 250° F. and the reported lap shear strength at room temperature was 3100 psi.

EXAMPLE III

Further experimental work, representative of the present invention, was carried out in joints constructed from phosphate fluoride treated titanium and graphite-epoxy composite substrates. The primer used was chromated epoxy resin identified above as BR-127 and the adhesive used was a modified epoxy film adhesive available from 3M Company under the designation AF-126. The partial cure of the resin was carried out at 160° F. for 2 hours. The adhesive was then applied and cured for 7 hours at 310° F. The specimen was then tested and showed a lap shear strength at −40° F. of 7340 psi.

This shear strength may be compared with reported work of a third party using the AF-126 adhesive and the proprietary primer UF-3296 identified in Example 1 above. In this reported work the primer was described as having been cured at 250° F. for 1 hour followed by adhesive curing at 310° F. for 7 hours. The lap shear strength at −40° F. was reported to be 2334 psi.

Having described specific embodiments of the present invention, it will be understood that modification thereof may be suggested to those skilled in the art, and it is intended to cover all such modifications as fall within the scope of the appended claims.

We claim:

1. In a method for the formation of a multi-component adhered structure, the steps comprising:
   (a) establishing a primer layer of a curable primer resin on at least one of the conforming mating surfaces of the components to be joined together in forming said structure;
   (b) heating said primer layer at a first temperature and for a period to expel volatile matter from said primer resin but insufficient to cross-link said primer resin to a completely cured state thereby leaving active bonding sites in said primer resin;
   (c) joining the mating surfaces of said components together with an intermediate adhesive layer between said mating surfaces and formed of a curable adhesive resin having bonding sites available for reaction with bonding sites in said primer layer; and
   (d) thereafter heating the thus joined structure at a substantially greater temperature than said first temperature and for a period sufficient to cure said adhesive and primer resins and establish cross-linking between the interfaces of said adhesive and primer resins.

2. The method of claim 1, wherein said primer layer has a thickness of 0.0001–0.0007 inch.

3. The method of claim 1, wherein said primer layer is heated in step (b) to a temperature within the range of about 150°–200° F. for a period of about 0.5–2 hours.

4. The method of claim 2, wherein said joined structure is heated in step (d) to a temperature at least 50° F. greater than the temperature of step (b).

5. The method of claim 1, wherein said primer layer is heated in step (b) under time and temperature conditions to achieve a degree of cross-linking of no more than about 50%.

6. The method of claim 1, wherein the volatile matter expelled from said primer layer in step (b) is at least 90% of the matter subject to being volatilized in said primer layer at the temperature of step (c).

7. The method of claim 1, wherein said adhesive layer has a thickness substantially greater than the thickness of said primer layer.

8. The method of claim 1, wherein said primer layer is heated in step (b) under time and temperature conditions sufficient to produce a tack free state for the surfaces of said primer layer while only partially curing said primer resin.

9. In a method for the formation of a multi-component adhered structure, the steps comprising:
   (a) establishing primer layers of curable primer resin on the conforming mating surfaces of the components to be joined together in forming said structure;
   (b) heating each of said primer layers at a first temperature and for a period to expel volatile matter from said primer resin but insufficient to cross-link said primer resin to a completely cured state thereby leaving active bonding sites in said primer resin;

(c) joining the mating surfaces of said components together with an intermediate adhesive layer between said primer layers and formed of a curable adhesive resin having bonding sites available for reaction with bonding sites in said primer layers; and (d) thereafter heating the thus joined structure at a substantially greater temperature than said first temperature and for a period sufficient to cure said adhesive and primer resins and establish cross-linking between the interfaces of said adhesive and primer resins.

10. The method of claim 9, wherein said primer layers have thicknesses within the range of 0.0001–0.0007 inch.

11. The method of claim 9, wherein said adhesive layer has a thickness substantially greater than the thickness of each of said primer layers.

12. The method of claim 9, wherein said adhesive layer has a thickness within the range of 0.005–0.01 inch.

13. The method of claim 9, wherein said multi-component adhered structure is a laminate panel structure and wherein said components are substantially two-dimensional panels with the conforming mating surfaces comprising the surfaces of said panels.

14. The method of claim 13, wherein said components are formed of metallic material and further comprising the step of surface treating said mating surfaces of said components prior to the application of said primer layers in order to enhance the cohesiveness of said primer layers to said mating surfaces.

15. The method of claim 14, wherein said metallic material comprises titanium and said step of surface treating comprises contacting said mating surfaces with phosphate fluoride.

16. The method of claim 13, wherein said primer layers are heated in step (b) to a temperature of about 150°–200° F. for a period of about 0.5–2 hours.

17. The method of claim 13, wherein said structure is heated in step (d) to a temperature at least 50° F. greater than the temperature of step (b).

18. The method of claim 13, wherein said primer layers are heated in step (b) under time and temperature conditions to achieve a degree of cross-linking of no more than about 50%.

19. The method of claim 9, wherein said structure comprises conforming mating surfaces defining a tongue and groove joint and one of said primer layers is provided on the tongue of one of said components and the other of said primer layers is provided in the groove of the other of said components.

20. The method of claim 9, wherein said primer layers are hated in step (b) under time and temperature conditions sufficient to produce a tack free state for the surfaces of said primer layers while only partially curing said primer resin.

* * * * *

UNITED STATES PATENT AND TRADEMARK OFFICE
CERTIFICATE OF CORRECTION

PATENT NO. : 5,205,895

DATED : April 27, 1993

INVENTOR(S) : Alvin E. Hohman, Jr. et al

It is certified that error appears in the above-identified patent and that said Letters Patent is hereby corrected as shown below:

Column 8, lines 58-59, change "surfaces" to --surface--.

Column 10, line 27, change "hated" to --heated--.

Signed and Sealed this

Fifth Day of July, 1994

*Attest:*

BRUCE LEHMAN

*Attesting Officer*     *Commissioner of Patents and Trademarks*